Figure 1:
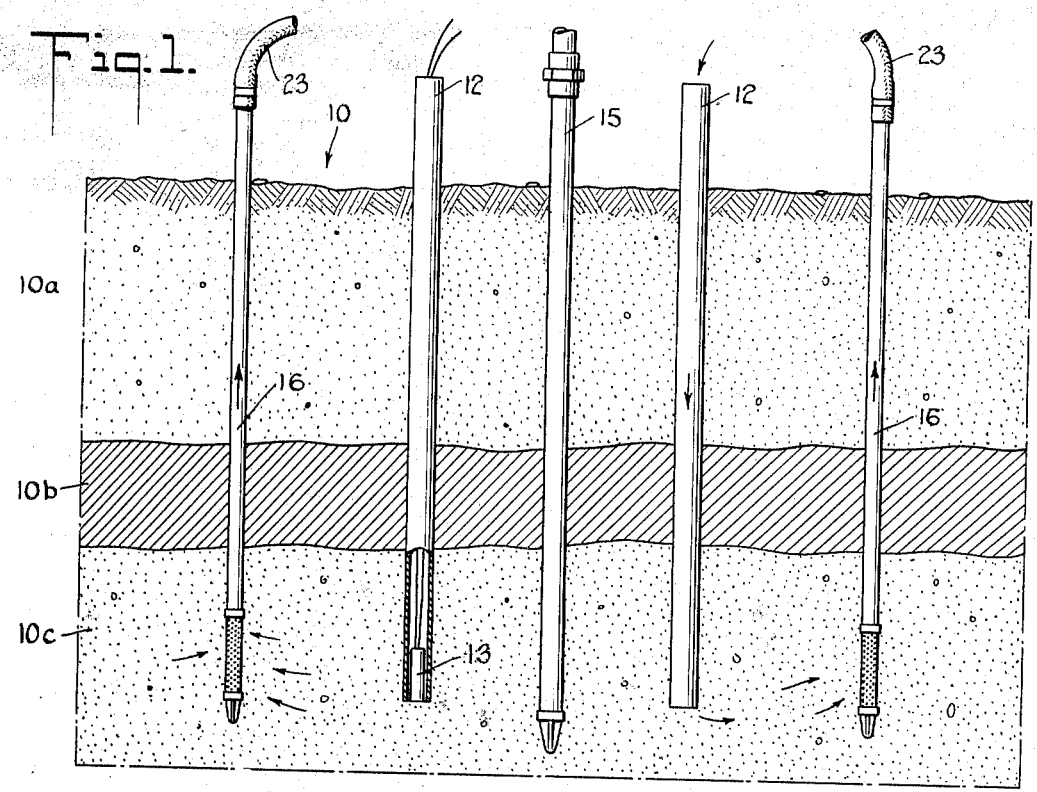

INVENTOR
Charles S. Ackley
BY
Henry J. Lucke
HIS ATTORNEY

March 18, 1941.  C. S. ACKLEY  2,235,695
METHOD OF RENDERING EARTH MATERIALS SOLID
Filed April 22, 1937   2 Sheets-Sheet 2
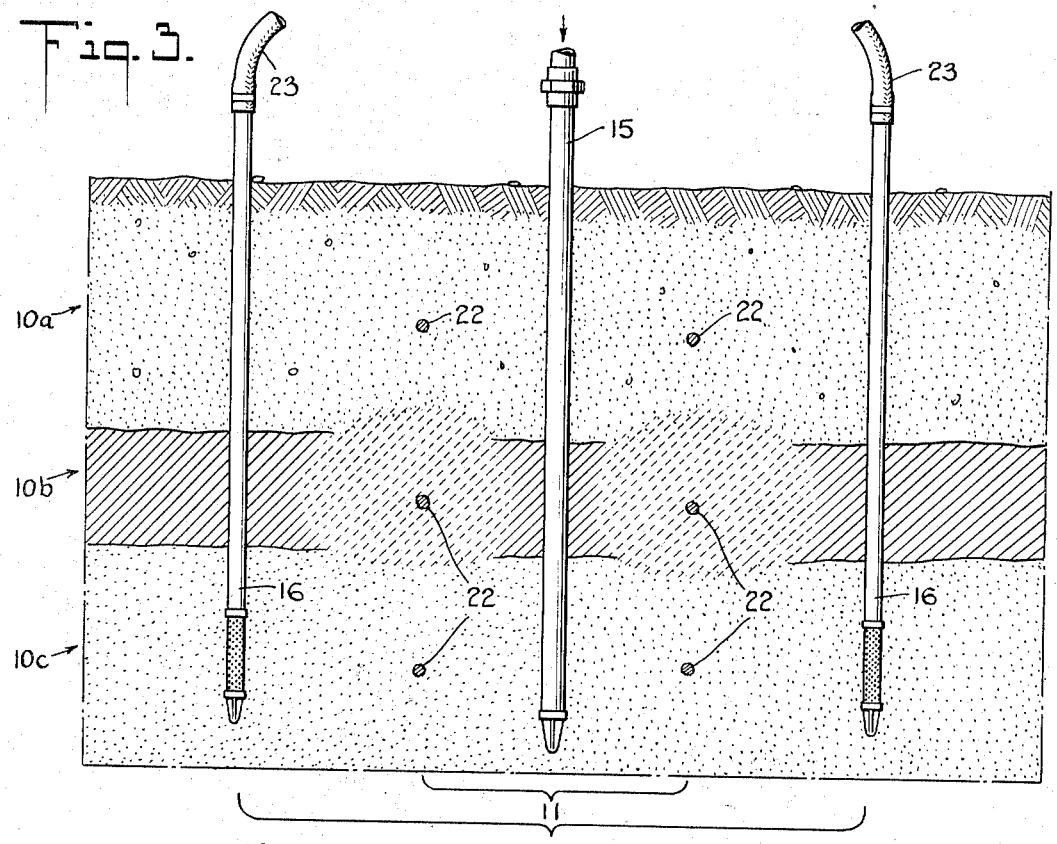
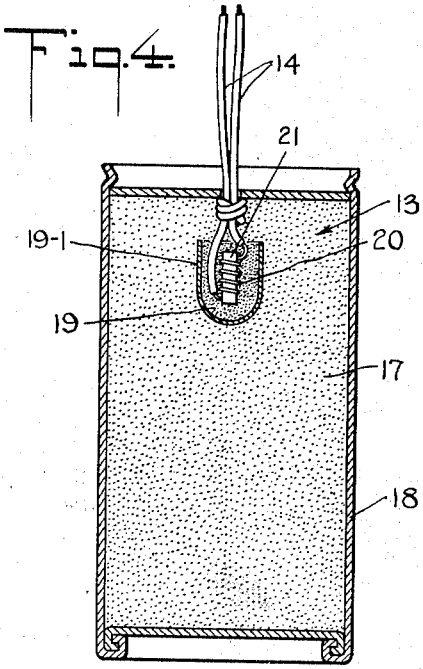
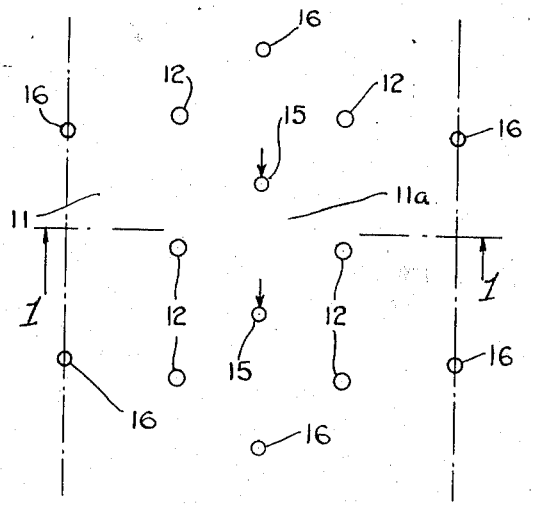
INVENTOR
Charles S. Ackley
BY
Henry J. Lucke
HIS ATTORNEY Patented Mar. 18, 1941

2,235,695

UNITED STATES PATENT OFFICE 2,235,695

METHOD OF RENDERING EARTH MATERIALS SOLID

Charles S. Ackley, New York, N. Y.

Application April 22, 1937, Serial No. 138,361

5 Claims. (Cl. 61—36)

This invention relates to a method of rendering earth materials solid, and particularly to such a method wherein a zone of the earth materials is heat treated prior to injecting a bonding medium thereinto.

The present invention is applicable to the method of my application for U. S. Patent, Serial No. 138,360 filed April 22, 1937, entitled Method of solidifying porous earth materials. Its use is not, however, restricted to such method.

In solidifying earth materials preparatory to construction operations, or for the prevention of flow of underground water courses, it is necessary that the earth be capable of receiving a bonding medium. This necessitates first the presence, throughout the earth materials to be treated, of adequate unrestricted pore passages through which the bonding material may diffuse.

In the case of naturally porous earth materials such as loose sands, fractured rock, or soil, the fulfillment of this requirement is inherent in the nature of the materials. In the case of clay, either in a unitary deposit, or stratified between layers of other material, the natural dense structure must be rendered pervious to the bonding medium.

Where there is an excess of natural earth moisture present in inherently porous materials, as for instance in quicksand, it is necessary that the pore passages be cleared of liquid before diffusion of the bonding medium therethrough can be effected.

The present method is designed to afford complete conditioning of the zone of earth materials before injection of the bonding medium. For this purpose, a center of intense heat is established at a strategic location, or several centers of intense heat are established at mutually spaced strategic locations within the zone of earth materials to be solidified. Preferably such centers of intense heat maintain their heat in gradually diminishing quantity following initial energizing.

The initial temperature may be sufficient to fuse a portion of the surrounding siliceous earth material.

If the material concerned is clay or partly clay, a center of intense heat established therein will effect "coking" of adjacent clay resulting in a dry, porous structure.

Where the earth materials concerned are naturally porous and contain an excess of moisture, as in the case of quicksand, a center of intense heat will convert the liquid to steam effecting diffusion of same radially of the center and a consequent elimination of liquid from the pore passages of the adjacent materials together with the heating of such materials.

Where the earth materials are naturally porous, but normally moist, the center of intense heat will effect drying of adjacent earth radially thereof and heating of same by conduction.

In the case of the presence of excess moisture in the earth materials and the consequent generation of steam adjacent the center or centers of intense heat, it is desirable that suction be created at one or more locations adjacent the boundary of the zone to be solidified, for directing the flow of steam throughout the zone and withdrawing the condensate therefrom. It may be desirable to create such suction in all cases for enhancing the spread of heat throughout the zone.

Following the initiation of the intense heat, the bonding medium is injected into the zone prepared for its reception and diffusion. Molten sulphur is advantageously the bonding medium employed because of its comparatively low melting point, extremely low degree of viscosity, and remarkable mobility in penetrating and diffusing throughout pore passages. The molten sulphur solidifies comparatively rapidly, is tenacious as a binder when solidified, and in its solidified state resists any disintegrating effect of corrosive soil waters. It is therefore especially effective in the formation of hard firm earth conglomerates having high compressive strength and suitable as a foundation for purposes of construction. However, other materials capable of functioning as a binder and having similar characteristics in a liquid and solid state as sulphur has in its molten and solidified states, respectively, may be employed.

During injection of the bonding medium it is desirable that suction be maintained at one or more locations adjacent the boundary of the zone being treated for enhancing diffusion of the bonding medium throughout the zone and for limiting the extent of diffusion.

The center or centers of intense heat are advantageously had by use of the well known material "Thermit."

"Thermit" is an ignitable mixture of iron oxide and finely divided aluminum. It is an inert mixture up to a temperature of 2800° F. At that temperature the aluminum ignites with the oxygen of the iron oxide and sets the iron free as super-heated liquid at a temperature of 5000° F. The ignition point, i. e., 2800° F., may be attained by use of a mixture having a considerably lower ignition point, but capable of developing the required temperature 2800° F. Suitable fuse means may be employed to ignite the intermediate mixture.

In the present case, a suitable quantity of the material "Thermit" is incorporated in a cartridge which is preferably waterproof. Provision is made for "firing" the cartridge, i. e., igniting the "Thermit," from its exterior. This is had advantageously by electric lead wires extending into the cartridge and connected to an electric heating element disposed within an ignition mixture of aluminum and barium peroxide segregated within the "Thermit" mixture. A cartridge is planted at a strategic location or several cartridges are planted at mutually spaced strategic locations within the earth zone to be solidified, the electrical lead wires extending to the surface for connection with a source of electric current.

Ignition of each cartridge results in the creation of approximately 5000° F. of heat at the cartridge location, the free molten iron collecting together with melted siliceous material, upon congealing, will establish a thermal center maintaining radiation, which slowly decreases in intensity for an extended period of time. Thus, requisite preconditioning of the adjacent earth materials and maintenance of the desired thermal conditions during the injection of the bonding medium, is effectively accomplished.

Figure 2:
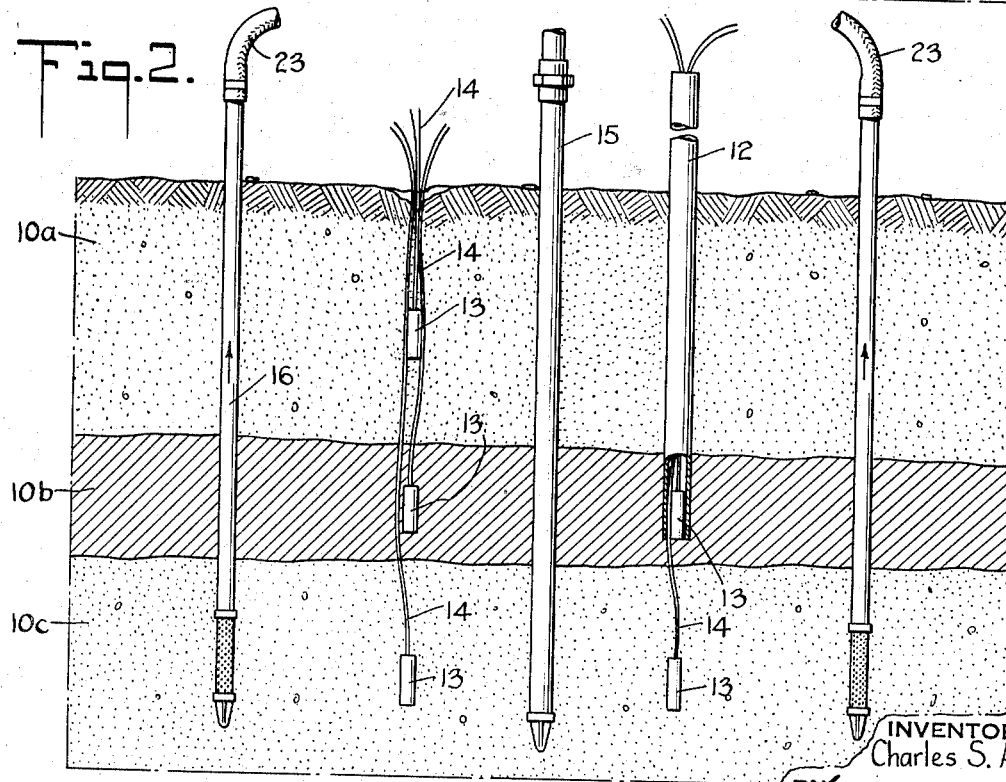

Referring to the drawings:

Fig. 1 illustrates a particular condition of a portion of the earth's crust which requires solidifying treatment before becoming adequate as a foundation for building construction. Apparatus for accomplishing a specific procedure in the application of the present method is illustrated at a preliminary stage of the method. The view is a vertical section taken on the line 1—1, Fig. 5;

Figs. 2 and 3 illustrated subsequent stages in the practice of the method;

Fig. 4 represents a vertical central section through one embodiment of "Thermit" cartridge pursuant to one aspect of this invention; and Fig. 5 is a diagrammatic plan view illustrating the relative positions of the various component pieces of the apparatus employed in Figs. 1, 2 and 3.

Referring to the drawings, at 10, see Figs. 1, 2 and 3, is illustrated, in vertical section, a portion of the earth's crust requiring solidification before becoming adequate as a foundation for a building or as a footing for other construction. The portion of the earth's crust 10, in the present case, includes a surface stratum 10a of porous earth materials, an intermediate stratum 10b of dense clay, and a lower stratum 10c of quicksand. It is intended that a zone 11, see especially Fig. 5, of the earth's crust 10 be solidified.

In effecting such solidification, the casings 12 are sunk in bore holes drilled at suitable mutually spaced locations surrounding an injection zone 11a. In the present case they bottom within the stratum 10c of quicksand. A "Thermit" cartridge 13, hereinafter described in detail, is dropped to the bottom of each casing 12, as by means of electrical lead wires, designated collectively 14. The casings are then raised to a new planting position, here located within the clay stratum 10b. Normally, the earth material will "cave in" around the planted cartridge as the casing is raised. If this doesn't occur, the cartridge may be buried by dropping a suitable filler, such as sand, on top of it through the casing.

It may be desirable in certain cases to drop a quantity of magnesite sand, or other suitable heat resisting material, to the bottom location, and to fashion such sand into substantially cup formation before positioning of the cartridge. This will insure retention of the molten iron in the form of a pool.

A second set of cartridges 13 are dropped to the bottoms of respective casings 12 at the new bottom locations in the clay stratum, the casings thereafter being raised to bottom within the stratum 10a of porous earth material, the cartridges being buried, if necessary, as afore-stated. A third set of cartridges 13 are planted at these new bottom locations in stratum 10a, and the casings removed entirely. The successive planting stages are illustrated in Figs. 1 and 2.

It is to be noted that, as is clearly shown in the drawings, the cartridges are actually buried beneath the surface of the earth so that a considerable amount of earth material rests upon them. Such earth material smothers the force of the explosive reaction occurring upon ignition of the "Thermit" material, and serves to confine the resulting heat within a relatively localized zone.

Either before, simultaneously with, or after sinking of the casings 12 and successive planting of the cartridges 13, injection pipes 15 may be jetted or otherwise driven from the surface of the earth within the zone 11a bounded by the casings 12. Likewise, well points 16 may be jetted or otherwise driven from the surface of the earth at suitable spaced locations surrounding the injection pipes 15 and the casings 12 to define the outer boundary of the zone 11.

The cartridges 13, see Fig. 4, advantageously comprise a charge 17 of the well-known material "Thermit" enclosed within a preferably waterproof covering 18. Disposed within the charge 17 is a secondary charge 19 of a suitable ignition mixture, such as powdered aluminum and barium peroxide, conveniently segregated within the cup container 19—1. Extending into the cartridges from the exterior thereof, are the electrical lead wires 14, the contact ends thereof being connected to the respective ends of an electrical heating element 20, such as nichrome wire, coiled about a core 21, preferably of asbestos paper.

The cartridges are fired in timed sequence from the bottom set upward, the duration of the time intervals between successive firings depending upon the circumstances. Usually injection of the bonding medium adjacent the respective locations of cartridge placement will immediately follow each successive firing.

Firing of the cartridges 13 results in the creation of centers of intense heat, approximately 5000° F., which radiate outwardly through the zone 11. The free molten iron and any melted siliceous material will collect, and will coagulate as they cool, see the formations 22, Fig. 3. Heat radiation from these formations 22 will gradually decrease in heat intensity, meanwhile continuing heat radiation throughout the adjacent earth materials.

In the present case, it is assumed that the stratum 10c represents quicksand. The well points 16 mutually spaced around the boundary of the zone 11 may be provided for the purpose of maintaining suction at such locations. For this purpose the respective well points are connected, as by means of the respective flexible hoses 23, to a vacuum pipe line (not shown) leading to a suitable exhaust pump. Creation of intense heat by firing of the lower set of cartridges 13 will convert the moisture content of the quicksand to steam. Creation and maintenance of suction at the well point locations will effect dewatering of the stratum 10c and directed flow of such generated steam throughout the stratum portion of zone 11, into the well points 16, for removal through the hose 23 and connected piping.

During the maintenance of suction at the well point locations, sulphur or other suitable bonding medium in a molten condition is injected through the injection pipes 15. Diffusion and flow thereof through the tenuous port passages of the dewatered and heated quicksand 10c are enhanced and directed toward and into the well points 16. Cold natural earth moisture will be drawn by the well points from the earth material surrounding the zone 11 in a flow directed oppositely to the flow of bonding medium. The two oppositely directed flows meeting at the boundary locations will determine the extent of diffusion of the bonding medium throughout the earth materials.

During, or after the treating of stratum 10c, the second set of cartridges 13 disposed in the clay stratum 10b may be fired. The intense heat, and maintenance of such heat in gradual diminishing quantities at the cartridge locations, will effect drying, cracking and "coking" of the adjacent clay material thus rendering it pervious to flow of bonding medium.

The injection pipes 15 and the well points 16 may be raised for treating the naturally porous earth stratum 10a, in like manner as that of stratum 10c.

In this way, solidification of the zone 11 of earth materials from the lowest point of treatment therein to the desired location thereabove may be had. The stratum 10c, now solidified, will be bonded to the upper stratum 10a, now solidified, through the coked and solidified portions of the clay stratum 10b.

In placing the various well points and injection pipes relative to the planted cartridges 13, due regard should be had to the extent of heat diffusion through the earth materials adjacent the cartridges 13. The placement must be determined by experiment in each case. The pipes, however, must be sufficiently beyond the heat range of the fired cartridges to be effectively protected from temperatures capable of melting the steel from which the pipes are fabricated.

It will be understood that the illustrations of the drawings and the description thereof are specific to only one procedure in carrying the general method of this invention into effect, and that materials analogous to "Thermit" may be used without departing from the spirit of the invention. The generic aspects of the invention are set forth herein and in the following claims.

I claim:

1. A method of heat treating earth materials which contain an excess of moisture comprising planting a charge of an ignitable mixture of finely divided aluminum and iron oxide within such earth materials, igniting such mixture; establishing suction at one or more locations removed from the resulting center of radiant heat for directing the flow of generated steam throughout, and the removal thereof from, a zone of the earth materials being treated.

2. A method of solidifying and conglomerating earth materials which contain an excess of moisture, comprising planting a charge or charges of thermit within such earth materials, igniting the thermit, creating suction at one or more locations removed from the resulting center of radiant heat for the purpose of directing flow of generated steam through, and the removal thereof from, a zone of the earth materials being treated, and introducing into the said earth materials, adjacent the center of radiant heat thus created, a molten bonding material having the property of solidifying on setting.

3. A method of solidifying and conglomerating earth materials comprising planting within the earth materials to be solidified and conglomerated a charge of an ignitable mixture of finely divided aluminum and iron oxide, igniting said mixture, and thereafter introducing into the said earth materials, adjacent the location of the ignited mixture, a molten bonding material having the property of solidifying on setting.

4. A method of solidifying and conglomerating porous earth strata which are separated by a stratum of relatively non-porous earth materials, comprising planting a charge or charges of thermit within said stratum of relatively non-porous earth materials, igniting the thermit, and injecting a bonding material into said porous earth strata and into the treated portions of said non-porous earth stratum.

5. A method of solidifying and conglomerating porous earth materials containing an excess of moisture, which comprises effecting an exothermic chemical reaction within the said earth materials, in situs, by planting a charge or charges of thermit within said earth materials, and by igniting the thermit to generate heat of a sufficiently high temperature to convert a considerable quantity of the said excess of moisture into steam; creating suction at locations substantially surrounding said thermit for defining a definite earth zone and for enhancing diffusion of said generated steam and for withdrawing the condensate thereof; and introducing a molten bonding medium into said zone while maintaining said suction.

CHARLES S. ACKLEY.